US011674499B2

(12) United States Patent
Lütkemeyer et al.

(10) Patent No.: US 11,674,499 B2
(45) Date of Patent: Jun. 13, 2023

(54) COUPLING DEVICE FOR COUPLING TOWER SEGMENTS OF A TOWER OF A WIND POWER INSTALLATION, TOWER SEGMENT, PART OF A TOWER, TOWER, WIND POWER INSTALLATION AND INSTALLATION METHOD

(71) Applicant: Wobben Properties GmbH, Aurich (DE)

(72) Inventors: Stefan Lütkemeyer, Aurich (DE); Frank Knoop, Aurich (DE); Ihno Coordes, Ihlow (DE); Jan-Ulfert Smit, Stolberg (DE); Ronald Lange, Leipzig (DE)

(73) Assignee: Wobben Properties GmbH, Aurich (DE)

( * ) Notice: Subject to any disclaimer, the term of this patent is extended or adjusted under 35 U.S.C. 154(b) by 0 days.

(21) Appl. No.: 17/483,397

(22) Filed: Sep. 23, 2021

(65) Prior Publication Data
US 2022/0090580 A1    Mar. 24, 2022

(30) Foreign Application Priority Data

Sep. 24, 2020  (DE) ......................... 102020124912.8

(51) Int. Cl.
*F03D 13/20*      (2016.01)
(52) U.S. Cl.
CPC ........ *F03D 13/20* (2016.05); *F05B 2240/912* (2013.01); *F05B 2260/301* (2013.01)
(58) Field of Classification Search
CPC ....... E04H 12/08; E04H 12/085; F03D 13/20; F05B 2240/912; F05B 2260/301
See application file for complete search history.

(56) References Cited

U.S. PATENT DOCUMENTS 6,957,518 B1 * 10/2005 Koch, Jr. ................. E04C 3/30
                                                            403/312
8,713,896 B2 *  5/2014 Willis ..................... E04H 12/34
                                                            52/651.01
(Continued)

FOREIGN PATENT DOCUMENTS

CN      105935852 A     9/2016
DE    102014112787 A1   3/2016
(Continued)

*Primary Examiner* — Andrew J Triggs
(74) *Attorney, Agent, or Firm* — Seed Intellectual Property Law Group LLP

(57) ABSTRACT

A coupling device for coupling tower segments, which are arranged on one another, of a tubular tower of a wind power installation, having a coupling plate for contact against a circumferential surface of the tower segments, which are arranged on one another, in an abutting region, comprising a fastening portion having a first contact surface for arranging on a circumferential surface of a first tower segment and a connecting portion having a second contact surface for arranging on a circumferential surface of a second tower segment, and at least one through-opening. The coupling device furthermore comprises a receiving plate which is arranged on an outer surface of the connecting portion of the coupling plate and has at least one receiving element for receiving a counter element which can be bolted to the threaded element and is formed coaxially with respect to the through-opening of the coupling plate and as an anti-twist protection for blocking the counter element from rotating and preventing bolting to the threaded element.

18 Claims, 14 Drawing Sheets

(56) References Cited

U.S. PATENT DOCUMENTS

| | | | |
|---|---|---|---|
| 10,704,535 B2 * | 7/2020 | Christensen | .......... E04H 12/342 |
| 2008/0041009 A1 | 2/2008 | Cairo et al. | |
| 2010/0071275 A1 | 3/2010 | Mathai et al. | |

FOREIGN PATENT DOCUMENTS

| | | |
|---|---|---|
| EP | 1889987 A1 | 2/2008 |
| EP | 2375057 A1 | 10/2011 |
| JP | 2004300737 A | 10/2004 |
| JP | 2008045395 A | 2/2008 |
| WO | 2011/147478 A1 | 12/2011 |

* cited by examiner

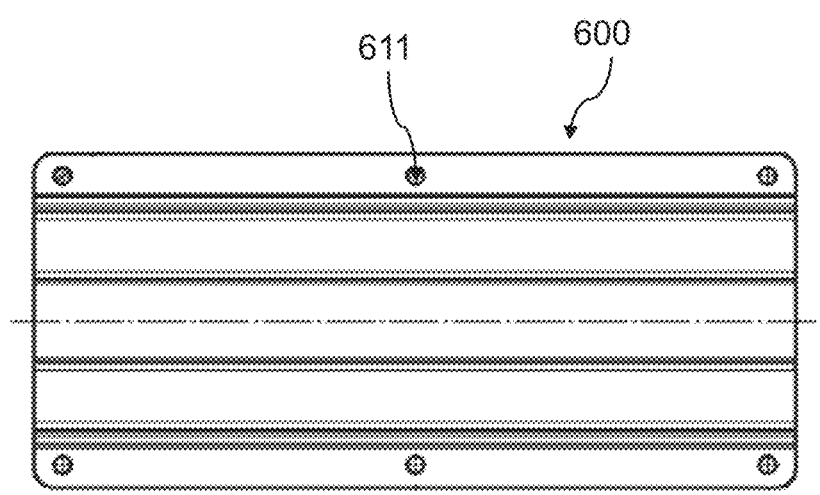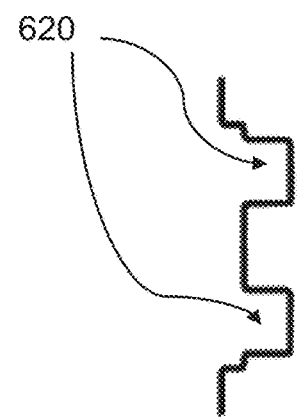
Fig. 10A
Fig. 10B

COUPLING DEVICE FOR COUPLING TOWER SEGMENTS OF A TOWER OF A WIND POWER INSTALLATION, TOWER SEGMENT, PART OF A TOWER, TOWER, WIND POWER INSTALLATION AND INSTALLATION METHOD

BACKGROUND

Technical Field

The disclosure relates to a coupling device for coupling tower segments, which are arranged on one another, of a tubular tower of a wind power installation. Furthermore, the disclosure relates to a tower segment, to part of a tower of a wind power installation, to a tower of a wind power installation and to a wind power installation. The disclosure furthermore relates to a method for installing tower segments, which are arranged on one another, of a tubular tower of a wind power installation.

Description of the Related Art

Towers of wind power installations are generally slender structures of a great height which have a comparatively small extent in particular orthogonally with respect to said height. The towers are frequently of tubular design in the form of a steel tower, a concrete tower, comprising or composed of reinforced concrete and/or prestressed concrete, or a hybrid tower, comprising a concrete tower portion and a steel tower portion. Said tubular towers are often segmented in the vertical direction and/or in the horizontal circumferential direction, and therefore the tubular towers comprise two or more tower segments. Such a segmentation of the tubular towers is required in particular in order to be able to transport the towers or the tower segments from a production site to the site of installation of the wind power installation.

The towers are exposed to high mechanical loads during operation. It is therefore required that the tower segments are securely fixed on one another and the connections ensure great reliability and/or load-bearing capacity. It is known in particular to connect the tower segments conventionally by means of horizontal and/or vertical connecting flanges. The vertical connecting flanges are designed to connect vertically adjacent tower segments to one another. By contrast, the horizontal connecting flanges are designed to connect horizontally adjacent tower segments to one another. However, the production and the transport of connecting flanges is generally complicated and expensive. The installation of such connecting flanges is also associated with a high outlay in terms of time and personnel, and therefore the construction of the tower of the wind power installation is overall lengthy and costly.

It is also known, for example, to connect tower segments, which are arranged on one another, to each other by overlapping plates. For this purpose, the plates are generally bolted to the tower segments. In order to produce the bolted connection, bolts have to be inserted from one side of the tower segments and bolted from an opposite side of the tower segments to a nut. For this purpose, a lift cage is required which is attached to an uppermost tower segment and is moved down to the bolted connection. The installation and possibly the subsequent checking of the bolted connections are therefore time-consuming to an extent such that the construction of the tower of the wind power installation and thus of the entire wind power installation is time-consuming and costly. In addition to reducing the outlay on work, it is desirable to improve work safety.

It is also known to connect an overlapping plate to tower segments arranged on one another by pressing insert nuts into bores of the tower segments or in a further overlapping plate and bolting said insert nut to bolts which are guided through bores in the overlapping plate. Insert nuts of this type are disadvantageous in particular in that tolerances, in particular bore tolerances, can neither be compensated for nor used.

The existing devices for connecting tower segments arranged on one another afford various advantages, but further improvements are desirable.

The German Patent and Trademark Office has searched the following further prior art in the priority application relating to the present application: DE 10 2014 112 787 A1, US 2008/0041009 A1, US 2010/0071275 A1.

BRIEF SUMMARY

One or more embodiments are directed to a coupling device for coupling tower segments, which are arranged on one another, of a tubular tower of a wind power installation, a tower segment, part of a tower of a wind power installation, a tower of a wind power installation and a wind power installation, and a method for installing tower segments, which are arranged on one another, of a tubular tower of a wind power installation, which reduce or eliminate one or more of the indicated disadvantages of existing solutions. Provided are techniques, which further increases the reliability and/or the load-bearing capacity of the connection and at the same time brings about a reduction in the outlay on installation, in particular without preventing the use of tolerances.

According to a first aspect, one or more embodiments are directed to a coupling device for coupling tower segments, which are arranged on one another, of a tubular tower of a wind power installation, comprising a coupling plate for contact against an abutting region of the tower segments arranged on one another, comprising a fastening portion having a first contact surface which is designed to be arranged on a circumferential surface of a first tower segment, and a connecting portion which is adjacent to the fastening portion and has a second contact surface which is designed to be arranged on a circumferential surface of a second tower segment and has at least one through-opening for the passage of a threaded element, a receiving plate which is arranged on the connecting portion, on an outer surface opposite the second contact surface, comprising at least one receiving element for receiving a counter element which can be bolted to the threaded element, wherein the at least one receiving element is formed coaxially with respect to the through-opening and as an anti-twist protection for blocking the counter element from rotating and preventing bolting to the threaded element.

The embodiments described here provides the coupling plate which, in a fitted state, can be arranged on a circumferential surface of the tower segments, which are arranged on one another, in such a manner that said coupling plate overlaps a joint. The arrangement of the receiving plate with the at least one receiving element as an anti-twist protection makes it possible for a threaded element to be able to be inserted from one side of the coupling plate into the through-opening and to be bolted on an opposite side to a counter element which can be received in the receiving element. By arranging the coupling plate at the abutting region, the tower segments, which are arranged on one another, can be mechanically connected to each other in the fitted state, in particular by means of bolted connections.

A secure and reliable connection of tower segments arranged on one another can be ensured by such a coupling device. The additional receiving plate arranged on the outer surface of the connecting portion permits installation, in particular insertion of a threaded element and bolting of the threaded element to a counter element, from one side of the tower segments. This dispenses with the necessity, during construction of a tower, of arranging a lift cage at an upper end of the tower segments in order to be able to move down to the height of the joint.

In particular, the coupling plate can be arranged on the circumferential surfaces of the tower segments which are arranged on one another and which, in the installed state, form an outer circumferential surface, in particular part of the outer circumferential surface, of the tower. In particular for the installation of the tower segments, platforms can be arranged on the side of the opposite circumferential surface, in particular the inner circumferential surface. It can thereby be ensured that the abutting region is easily accessible to personnel in order from said side, i.e., in particular the inner side, to permit the threaded element to be inserted and passed into the through-openings, in particular of the second tower segment and of the coupling plate, and bolting of the threaded element to a counter element, which can be received in the receiving element, from this side.

Coupling devices of this type are advantageous in particular to the effect that a substantially shortened installation time and at the same time an increase in work safety can be ensured. A segmented tower with such coupling devices for coupling the tower segments arranged on one another can be produced overall significantly more cost-effectively and/or simply and/or more rapidly than with known connecting devices. Consequently, the outlay on personnel and/or the outlay on time can be reduced and/or costs saved. In particular, the construction site activities for installing the tower segments and thus also for constructing the tower can be significantly reduced.

The solution described here is based inter alia on the finding that even if, because of the additionally attached receiving plate, a weight of the coupling device is increased in comparison to a simple overlapping plate, the abovementioned advantages predominate and increase the economic efficiency.

The coupling device is not restricted to the use in tubular towers, in particular wind power installation towers, even though it can be used particularly advantageously and in an economic manner here. On the contrary, the coupling device can also be used in the case of segmented structures of a different type and/or in the case of segmented towers of a different type and/or other segmented elements, in order to connect individual segments, in particular vertically and/or horizontally adjacent segments.

The first contact surface can preferably have a shape which corresponds to a segment of a circumferential surface of the tower. The shape of the first contact surface thus preferably substantially corresponds to a geometry of part of the circumferential surface of the first tower segment. In a corresponding manner, the second contact surface can preferably have a shape which corresponds to a segment of a circumferential surface of the tower. In particular, the shape of the second contact surface accordingly substantially corresponds to a geometry of part of the circumferential surface of the second tower segment. If the first tower segment and/or the second tower segment are, for example, of substantially tubular and/or hollow-cylindrical design or are designed as part of a tube and/or as part of a cylinder, the first contact surface and/or the second contact surface thus preferably have the shape of a casing segment of a cylinder or of part of a casing segment of a cylinder. If the first tower segment and/or the second tower segment are, for example, of substantially frustoconical design or are designed as part of a truncated cone, the first contact surface and/or the second contact surface thus preferably have the shape of a casing segment of a cone, in particular of a truncated cone, or of part of a casing segment of a cone, in particular a truncated cone. If the first tower segment and/or the second tower segment are, for example, of polygon design or are designed as part of a polygon, the first contact surface and/or the second contact surface thus preferably has a flat, planar extent which corresponds to a circumferential surface of one of the sides of the polygonal tower segment or of the tower segment as part of a polygon.

The shape of the first contact surface and/or of the second contact surface as a segment of the circumferential surface of the tower can relate in particular to a segment in the circumferential direction of the tower. The first contact surface and/or the second contact surface can therefore preferably not form a ring, in particular not a circular ring or polygon, but rather the circumferential surface of the tower can merely cover part of its circumference.

The first contact surface and/or the second contact surface can preferably be formed flat, in particular not curved, or can have a radius. The radius can preferably correspond to a radius of the circumferential surface of the first tower segment and/or of the second tower segment or can differ slightly therefrom. In particular if the first contact surface and/or the second contact surface has the shape of a casing segment of a cone, this radius can change in a vertical direction in the fitted state, in particular can taper upwards.

In the fitted state, towers of wind power installations generally have a vertical longitudinal axis and a substantially annular cross section orthogonally with respect to said longitudinal axis. Said substantially annular cross section can be of circularly annular design or else can have a polygonal shape. The term annular is therefore understood in this application as meaning not only a circularly annular configuration, but also a polygonal and/or multi-sided configuration having a plurality of rectilinear portions. In the fitted state, tower segments which are arranged on one another, in particular vertically and/or horizontally adjacent tower segments, can be connected to one another by means of the coupling device. In particular, the coupling plate can be arranged here on the circumferential surface of the first tower segment and on the circumferential surface of the second tower segment. The fitted state is preferably understood as meaning a state which relates to the vertically oriented tower. The orientations described for the fitted state have to be correspondingly adapted in the manufacturing state and/or transport state to a longitudinal axis of the tower or of part thereof that is temporarily not oriented vertically.

In an installation state, for example, the coupling device can be arranged on the first tower segment. In particular, the fastening portion here can be fastened to the first tower segment such that the connecting portion protrudes over a joint-side edge of the first tower segment. The joint-side edge can preferably be understood here as meaning an edge of an end surface of the first tower segment, which end surface, in the fitted state, strikes against an end surface of the second tower segment and forms the joint.

A joint can be understood as meaning in particular a location at which tower segments which are arranged on one another strike against each other with their end surfaces. In the fitted state, the joint can extend here substantially in a horizontal direction, i.e., in the circumferential direction, or in a vertical direction, i.e., in the longitudinal direction. The abutting region describes in particular a region of the first tower segment and of the second tower segment at which the coupling device is arranged in the fitted state.

If reference is made here to the tower, part of a tower, the tower segment and the coupling device in relation to the tower segment, this relates in particular to the fitted state or the installation state of the coupling device, in which the coupling device, in particular the first contact surface and/or the second contact surface, is arranged on the circumferential surface of the first tower segment and/or of the second tower segment. In particular, directional details, such as, for example, radially, in the circumferential direction, etc., preferably relate to a tower, in particular to a substantially vertical longitudinal axis of a tower, and relate to any cross-sectional shapes of such a tower, in particular both to circularly annular cross sections and also to polygonal cross sections. Furthermore preferably, details, such as horizontally, vertically, bottom, top, etc., likewise relate to the fitted state and/or the installation state.

A tower segment can preferably be understood as meaning an annular element which can have a circularly annular or a polygonal cross section, or part of an annular element. A tower can thus in particular comprise a plurality of tower segments which, in the fitted state, are arranged vertically one above another and/or horizontally next to one another.

Towers, in particular towers of wind power installations, can preferably taper from their lower to their upper end. The orientation of the tower wall of a tapering tower generally differs from the vertical by only a few degrees. If, in this application, reference is made to orientations, in particular in the fitted state, for example top, bottom, radially, horizontally, vertically, etc., this is therefore correspondingly also intended to apply to tapering towers and accordingly to tower walls which are slightly inclined in relation to the vertical.

Various designs for towers of wind power installations are known. In particular, towers of solid design, made from concrete and/or reinforced concrete and/or prestressed concrete and/or steel, have been realized. The present disclosure further relates in particular to towers of steel design or hybrid design.

The first contact surface serves in particular to arrange the coupling device, in particular the coupling plate, on the tower segment. In particular, the fastening portion can be designed to fasten the coupling plate to the first tower segment. For example, the fastening portion can have through-openings for the passage of a fastening element, in particular a threaded element. The coupling plate can preferably be arranged on the first tower segment in such a manner that the through-openings of the fastening portion are coaxial with respect to the through-openings of the tower segment, such that threaded elements, in particular bolts or threaded bolts, can be inserted through the through-openings from a first side, passed through and bolted to a counter element, in particular a nut, from a second side. Such a bolted connection of the coupling plate to the tower segment can take place in particular in the manufacturing state and/or transport state, i.e., prior to the construction of the tower.

Alternatively, for example, the fastening portion, in particular the first contact surface of the fastening portion, can be welded to part of the tower segment. If, for example, the tower segment is manufactured from concrete and/or reinforced concrete and/or prestressed concrete, preferably the fastening portion or parts of the fastening portion can be set in concrete.

Adjacent to the fastening portion, in particular in the direction of a main direction of extent of the coupling plate, the coupling plate has the connecting portion. The connecting portion and the fastening portion can preferably lie substantially in the same plane. This means preferably that the connecting portion and the fastening portion have in particular an angle of approximately 0°. In particular, there can be angle, or an offset can be formed, between the connecting portion and the fastening portion. An angle or an offset between the connecting portion and the fastening portion can be advantageous in particular if, for example, the tower segment and/or the tower segments, which are arranged on one another in the fitted state, form an angle or an offset.

The main direction of extent can preferably describe a direction which, in the fitted state, extends substantially orthogonally to the joint.

The at least one through-opening arranged in the connecting portion is designed in particular for the passage of a threaded element, in particular a bolt or a threaded bolt. In the fitted state, the threaded element can preferably be passed through a through-opening, which can be formed in the second tower segment, and through the through-opening of the connecting portion, and bolted to the counter element arranged in the receiving element, in particular to a nut.

Particularly preferably, the connecting portion and the receiving plate each have two, three or more through-openings. Preferably, the through-openings can be arranged in each case in a row. In particular, the through-openings can be arranged in two, three or more rows. In the fitted state, the rows can preferably be substantially parallel to the joint.

A particular advantage of the coupling device is that the formation of an annular, in particular circularly annular, flange can be dispensed with. Such a coupling device can be produced and/or transported significantly more cost-effectively than annular, in particular circularly annular connecting flanges.

A particularly preferred development of the coupling device is distinguished in that the coupling device comprises a corresponding counterplate, wherein the coupling plate is designed for contact against a first circumferential surface, in particular an outer circumferential surface, of the tower segments, which are arranged on one another, at the abutting region, wherein the first contact surface of the fastening portion of the coupling plate is designed to be arranged on a first circumferential surface, in particular an outer circumferential surface, of the first tower segment, and the second contact surface of the connecting portion of the coupling plate is designed to be arranged on a first circumferential surface, in particular an outer circumferential surface, of the second tower segment, and wherein the corresponding counterplate is designed for contact against a second circumferential surface, in particular an inner circumferential surface, of the tower segments, which are arranged on one another, at the abutting region, comprising a corresponding fastening portion having a corresponding first contact surface which is designed to be arranged on a second circumferential surface, in particular an inner circumferential surface, of the first tower segment, and a corresponding connecting portion which is adjacent to the corresponding fastening portion having a corresponding second contact surface which is designed to be arranged on a second circumferential surface, in particular an inner circumferential surface, of the second tower segment and having at least one through-opening for the passage of a threaded element.

According to the above-described preferred development, the corresponding counterplate is provided in addition to the coupling plate, wherein the coupling plate and the corresponding counterplate are designed for contact against opposite circumferential surfaces of the tower segments, which are arranged on one another, at the abutting region. In the fitted state, the coupling plate and the corresponding counterplate can therefore preferably surround a wall portion of the first tower segment and of the second tower segment at the abutting region.

The arrangement of the receiving plate having the at least one receiving element as an anti-twist protection makes it possible for a threaded element to be able to be passed from one side of the corresponding counterplate into the through-openings of the corresponding counterplate, of the tower segment and of the coupling plate and to be bolted to a counter element which can be received in the receiving element. The corresponding counterplate can preferably be designed to support a lower side of a head of the threaded element or of a counter element. Two tower segments arranged on one another can thereby be connected mechanically to one another rapidly and reliably.

The coupling plate and the counterplate can preferably be designed in a corresponding manner, and therefore they can be arranged on the opposite circumferential surfaces and connected to one another in the fitted state in order to connect the tower segments arranged on one another to one another. The at least one through-opening of the corresponding connection portion can preferably be arranged here in order, in the fitted state, to be substantially coaxial with respect to the at least one through-opening of the coupling plate.

The coupling plate and the corresponding counterplate can preferably be of substantially structurally identical design. A shape of the coupling plate and of the corresponding counterplate can preferably be substantially identical, in particular if the coupling plate and the corresponding counterplate have a flat, planar extent. The coupling plate and the corresponding counterplate can preferably differ in that the receiving plate is arranged only on the coupling plate and the corresponding counterplate is free from an additional receiving plate.

In particular, the first contact surface of the fastening portion of the coupling plate can have a shape which corresponds to a segment of the first circumferential surface, in particular the outer circumferential surface, of the tower. Preferably, the first corresponding contact surface of the corresponding fastening portion of the corresponding counterplate can have a shape which corresponds to a segment of the second circumferential surface, in particular the inner circumferential surface of the tower. Preferably, the shape of the first contact surface of the fastening portion of the coupling plate thus substantially corresponds to a geometry of part of the first circumferential surface, in particular the outer circumferential surface, of the first tower segment and the shape of the corresponding first contact surface of the corresponding fastening portion of the corresponding counterplate thus substantially corresponds to a geometry of part of the second circumferential surface, in particular the inner circumferential surface, of the first tower segment.

In a corresponding manner, the second contact surface of the connecting portion of the coupling plate can have a shape which corresponds to a segment of the first circumferential surface, in particular the outer circumferential surface, of the tower. Preferably, the second corresponding contact surface of the corresponding connecting portion of the corresponding counterplate can have a shape which corresponds to a segment of the second circumferential surface, in particular the inner circumferential surface, of the tower. Preferably, the shape of the second contact surface of the connecting portion of the coupling plate thus substantially corresponds to a geometry of part of the first circumferential surface, in particular the outer circumferential surface, of the second tower segment and the shape of the corresponding second contact surface of the corresponding connecting portion of the corresponding counterplate thus substantially corresponds to a geometry of part of the second circumferential surface, in particular the inner circumferential surface, of the second tower segment.

Particularly preferably, the corresponding connecting portion can have two, three or more through-openings, wherein preferably the number of through-openings of the corresponding connecting portion can correspond to a number of through-openings of the connecting portion. The through-openings of the corresponding connecting portion can preferably be arranged in a row. In particular, the through-openings can be arranged in two, three or more rows. In the fitted state, the rows can preferably be substantially parallel to the joint.

The corresponding fastening portion of the corresponding counterplate can preferably be designed in a manner corresponding to the fastening portion of the coupling plate. For example, both the fastening portion of the coupling plate and the corresponding fastening portion of the corresponding counterplate can have through-openings which are designed to receive threaded elements. As a result, in the fitted state and/or installation state, the corresponding counterplate can preferably be connected to the coupling plate and bolted to the first tower segment.

It is particularly preferred that the at least one receiving element has a cross section which is designed to secure the counter element against twisting, wherein the receiving element preferably is designed as a recess in the receiving plate, or is designed as a depression in the receiving plate, wherein preferably the cross section differs from a circular shape. Particularly simple anti-twist protection can thereby be provided.

Particularly preferably, the cross section can be designed in a manner corresponding to a shape of the counter element to be used, in order to be able to ensure anti-twist protection of the counter element. Particularly preferably, for example, the cross section can be designed as a polygon, in particular a hexagon, in order to be able to ensure anti-twist protection for a polygonal, in particular hexagonal, counter element, preferably a nut.

Particularly preferably, the receiving plate can be designed as a metal plate with punched-out shapes for receiving the counter elements. An additional weight of the receiving plate can thereby be kept low and at the same time simple and reliable anti-twist protection can be provided.

In a further preferred variant embodiment of the coupling device, it is provided that the at least one receiving element is designed as a captive-securing means for holding the counter element on the receiving plate. By means of the additional configuration of the receiving elements as a captive-securing means, the installation can be further simplified and the installation time reduced.

In particular, the counter element can be preassembled and/or inserted into the receiving element in order, in a next step, for the threaded element to be able to be bolted to the counter element. The receiving element is accordingly designed to prevent the counter element from dropping out after the counter element has been inserted into the receiving element.

It is particularly preferred if the receiving plate has at least one through-opening for the passage of the threaded element and/or of the counter element, wherein the at least one receiving element comprises a holder which, on a side of the receiving plate facing away from the coupling plate, is arranged in the region of the at least one through-opening and at least partially delimits a cavity for holding the counter element. Such a holder makes it possible to hold the counter element, which is to be received, securely on the receiving plate in order to be bolted to a threaded element. The installation can thereby be further simplified.

The cavity of the holder can have in particular an inner diameter which is larger than an outer diameter of the counter element to be received. Alternatively, the cavity of the holder can have in particular an inner diameter which is identical to the outer diameter of the counter element to be received. In particular, a cross section of the holder, in particular a shape and/or a dimension of the cavity, can be adapted to a cross section, in particular to a shape and/or a dimension, of the counter element to be received.

Particularly preferably, a cross section, in particular the shape and/or the dimension, of the holder can be designed to secure the counter element against twisting. According to this configuration, the holder can preferably be designed both as a captive-securing means and as anti-twist protection.

It is preferred that the holder comprises interconnected webs which are fastened to the receiving plate and delimit the cavity, wherein preferably the holder comprises at least one clamping limb which is connected to the webs and is movable from an inoperative position, in which the at least one clamping limb delimits a first cross section of the holder, into a clamping position for clamping the counter element, in which clamping position the at least one clamping limb delimits a second cross section of the holder that is larger than the first cross section, wherein preferably the at least one clamping limb in the clamping position has a clamping force which is designed to hold the counter element captively.

The formation of the holder with interconnected webs makes it possible for particularly simple captive-securing means of a low additional weight to be provided. By means of the at least one clamping limb, a particularly simple variant embodiment of a combination of the captive-securing means and the anti-twist protection can be provided.

According to a further variant embodiment of the coupling device, it is provided that the coupling device comprises a covering which is arranged on a side of the receiving plate facing away from the coupling plate and/or on the outer surface of the connecting portion of the coupling plate, wherein the covering surrounds the at least one receiving element and/or the receiving plate.

The covering can preferably be designed as an additional captive-securing means. By means of the covering as an additional captive-securing means, the necessity of a further captive-securing means can preferably be rendered superfluous.

The covering can preferably be designed as a weather shield. In particular, the covering can be designed in order for the at least one receiving element and/or the receiving plate to be sealed from an environment. If the covering is designed in particular in order to seal the receiving plate and/or a bolted connection of the threaded element to the counter element in the region of the receiving plate from an environment, the seal, preferably also in addition to a further captive-securing means, can be arranged as a weather shield, in particular over the above-described holder.

Particularly preferably, the covering can be designed as an angled metal plate which is arranged on the side of the receiving plate facing away from the coupling side and/or on the outer surface of the connecting portion of the coupling plate.

It is particularly preferred if the coupling device comprises a lining element which is designed to be arranged on the first contact surface of the fastening portion and/or the second contact surface of the connecting portion of the coupling plate, or to be arranged optionally on the corresponding first contact surface of the corresponding fastening portion and/or the corresponding second contact surface of the corresponding connecting portion of the corresponding counterplate, wherein preferably the lining element comprises at least one through-opening for the passage of the threaded element and can be arranged in such a manner that the at least one through-opening of the lining element and the at least one through-opening of the connecting portion and/or optionally the at least one through-opening of the corresponding connecting portion are coaxial with respect to one another.

The lining element can preferably be designed in order, in the fitted state, to be arranged between the first contact surface of the fastening portion of the coupling plate and the first circumferential surface of the first tower segment and/or between the second contact surface of the connecting portion of the coupling plate and the first circumferential surface of the second tower segment.

The lining element can preferably be designed in order, in the fitted state, to be arranged between the first corresponding contact surface of the corresponding fastening portion of the coupling plate and the second circumferential surface of the first tower segment and/or between the second corresponding contact surface of the corresponding connecting portion of the corresponding counterplate and the circumferential surface of the second tower segment.

Particularly preferably, two, three or more lining elements can be provided which are designed to be arranged on the first contact surface of the fastening portion and/or on the second contact surface of the connecting portion of the coupling plate and/or to optionally be arranged on the corresponding first contact surface of the corresponding fastening portion and/or on the corresponding second contact surface of the corresponding connecting portion of the corresponding counterplate.

The lining element can preferably be designed as a lining plate, in particular a plate. The arrangement of the lining element makes it possible in particular to minimize air gaps and thereby further increase the reliability of the connection.

It is particularly preferred that the coupling device comprises the counter element, wherein preferably the counter element is preassembled on the receiving element, wherein preferably the counter element is designed as a nut, preferably comprising a washer with a supporting surface for the nut.

According to a further variant embodiment of the coupling device, it is provided that the coupling device comprises a guide lug which is arranged on an outer edge of the coupling plate, which outer edge is adjacent to the connecting portion in a main direction of extent of the coupling plate, and protrudes obliquely from the outer edge, or is optionally arranged on an outer edge of the corresponding counterplate, which outer edge is adjacent to the corresponding connecting portion in a main direction of extent of the corresponding counterplate, and protrudes obliquely from the outer edge, wherein preferably the guide lug extends from the outer edge at an angle of between 90° and 180° with respect to the connecting portion or optionally with respect to the corresponding connecting portion. The arrangement of the guide lug makes it possible to further simplify an arrangement of the tower segments on one another, preferably one above another. The outlay on installation of the entire tower can therefore also be reduced further.

In the fitted state, the guide lug can preferably extend radially inwards or radially outwards from the outer edge. Particularly preferably, the guide lug can extend at an angle of between 100° and 160°, in particular between 110° and 145°, in particular between 120° and 140°, from the outer edge.

The guide lug is advantageous in particular to the effect that it is designed to guide a first tower segment during the lowering of the first tower segment onto the second tower segment and/or during the arranging of the first tower segment on the second tower segment, or in order to guide the second tower segment during the lowering onto the first tower segment and/or during the arranging on the first tower segment. The tower segments can thereby be arranged on one another in a particularly simple manner. In addition, it can be ensured in particular that the tower segments are positioned exactly in order to permit a reliable connection of the tower segments by means of the coupling device.

According to a further aspect, provided is a tower segment for a tubular tower of a wind power installation, comprising two, three or more coupling devices, as described above, wherein the first contact surface of the fastening portion of the coupling plate is arranged on the circumferential surface of the tower segment at the abutting region, wherein the connecting portion of the coupling plate in each case protrudes over a joint-side edge of the tower segment.

By fastening in each case the fastening portion of the coupling plates to the tower segment at the abutting region, the two, three or more coupling devices can be preassembled on the tower segment. This provides a tower segment which can be arranged on a further tower segment and can be connected to the further tower segment via the coupling device. By means of the connecting portion protruding over the joint-side edge, the tower segment can in particular be arranged on the further tower segment in a particularly simple and exact manner. Furthermore, the receiving plate on the outer surface opposite the second contact surface of the connecting portion permits particularly simple installation.

In a preferred variant embodiment of the tower segment, it is provided that the coupling devices each comprise a corresponding counterplate, as described above. The first corresponding contact surface of the corresponding fastening portion of the corresponding counterplate can preferably be arranged on the second circumferential surface of the tower segment at the abutting region. In this preferred variant embodiment, the first contact surface of the fastening portion of the coupling plate can be arranged on the first circumferential surface of the tower segment at the abutting region. In particular, the coupling plate and the corresponding counterplate can in each case be arranged on opposite circumferential surfaces, in particular the inner circumferential surface and the outer circumferential surface, of the tower segment at the abutting region. As a result, the corresponding connecting portion of the corresponding counterplate also protrudes over the joint-side edge of the tower segment. In this connection, the second contact surface of the connecting portion of the coupling plate can preferably be spaced apart from the second corresponding contact surface of the corresponding connecting portion of the corresponding counterplate. This distance can preferably be designed in order to insert the further tower segment between the contact surfaces in order to connect said tower segment in each case to the coupling plate and to the corresponding counterplate.

Particularly preferably, the tower segment can comprise two, three or more coupling devices, as described above, wherein in each case the first contact surface of the fastening portion of the coupling plate and the first corresponding contact surface of the corresponding fastening portion of the corresponding counterplate are aligned with respect to one another and are arranged on the opposite circumferential surfaces of the tower segment at the abutting region, wherein in each case the connecting portion of the coupling plate and the corresponding connecting portion of the corresponding counterplate protrude spaced apart from one another over the joint-side edge of the tower segment and comprise through-openings oriented coaxially with respect to one another.

According to a further aspect, provided is a tower of a wind power installation, comprising a first tower segment, in particular as described above, and a second tower segment, which tower segments are connected to each other via two, three or more coupling devices as described above, wherein in each case the first contact surface of the fastening portion of the coupling plate is arranged on the circumferential surface of the first tower segment at the abutting region, and wherein in each case the second contact surface of the connecting portion of the coupling plate is arranged on the circumferential surface of the second tower segment at the abutting region, wherein the second tower segment has at least one through-opening which is coaxial with respect to the at least one through-opening of the connecting portion of the coupling plate, wherein in each case the connecting portion of the coupling plate is connected to the second tower segment via a threaded element which is arranged in the through-openings and is bolted to a counter element received in the receiving element.

Particularly preferably, the coupling devices can each comprise a corresponding counterplate. Particularly preferably, in each case the first contact surface of the fastening portion of the coupling plate and the first corresponding contact surface of the corresponding fastening portion of the corresponding counterplate can be aligned with respect to one another and arranged on the opposite circumferential surfaces of the first tower segment at the abutting region. In particular, in each case the second contact surface of the connecting portion of the coupling plate and the second corresponding contact surface of the corresponding connecting portion of the corresponding counterplate can be arranged on the opposite circumferential surfaces of the second tower segment at the abutting region. The second tower segment can preferably have at least one through-opening which, in the fitted state described here, is coaxial with respect to the at least one through-opening of the connecting portion of the coupling plate and to the at least one through-opening of the corresponding connecting portion of the corresponding counterplate. Particularly preferably, the connecting portion of the coupling plate and the corresponding connecting portion of the corresponding counterplate can be connected to the second tower segment via a threaded element which is arranged in the through-openings and is bolted to a counter element received in the receiving element.

According to a further aspect, provided is a tower for a wind power installation, comprising at least one part of a tower, as described above, and/or at least one tower segment, as described above, and/or at least one coupling device, as described above.

Furthermore, provided is a wind power installation, comprising a tower, as described above, and/or at least one part of a tower, as described above, and/or at least one tower segment, as described above, and/or at least one coupling device, as described above.

According to a further aspect, provided is a method for installing tower segments, which are arranged on one another, of a tubular tower of a wind power installation, comprising the steps of: providing a first tower segment, in particular as described above, and a second tower segment, providing two, three or more coupling devices as described above, preassembling the two, three or more coupling devices on the first tower segment by arranging the first contact surface of the fastening portion of the coupling plate on a circumferential surface of the first tower segment at the abutting region, arranging the first tower segment and the second tower segment on one another and coupling the first tower segment and the second tower segment by connecting the connecting portion of the coupling plate to the second tower segment by inserting threaded elements into a respective through-opening of the second tower segment from a side facing a second circumferential surface of the second tower segment and passing the threaded elements through the through-openings of the second tower segment and of the coupling plate, and prestressing a connection of the threaded elements to counter elements received in the receiving elements by applying a prestressing force to the connection from the side facing the second circumferential surface of the second tower segment.

In a preferred variant, this method, in particular the step of preassembling the two, three or more coupling devices on the first tower segment, can comprise the following steps: aligning the first contact surface of the fastening portion of the coupling plate and the corresponding first contact surface of the corresponding fastening portion of the corresponding counterplate with respect to one another and arranging the first contact surface of the fastening portion of the coupling plate and the corresponding first contact surface of the corresponding fastening portion of the corresponding counterplate on the opposite circumferential surfaces at the abutting region.

Furthermore, in a further preferred variant of this method, in particular the step of coupling the first tower segment and the second tower segment, can comprise the following steps: coupling the first tower segment and the second tower segment by connecting the connecting portion of the coupling plate and the corresponding connecting portion of the corresponding counterplate to the second tower segment, by inserting the threaded elements into the through-openings of the corresponding counterplate and passing the threaded elements through the through-openings of the corresponding counterplate, of the second tower segment and of the coupling plate, and prestressing a connection of the threaded elements to the counter elements, which are received in the receiving elements, by applying a prestressing force to the connection from a side facing the corresponding counterplate.

The application of the prestressing force to the bolted connection can thereby take place from one side, in particular from an inner side.

Platforms can preferably be present in an interior space of a tower, and therefore a joint of the tower segments arranged on one another is easily accessible from the inner side for personnel. The necessity of inserting a threaded element, in particular a bolt, from an outer side, is rendered superfluous by this configuration. As a result, a particularly simple installation and a reduction in the outlay on installation and an increase in the work safety can be ensured.

A counter element can preferably be pre-positioned in each case on each receiving element, in particular adjacent to a through-opening of the coupling plate, and therefore, after positioning of the first tower segment, the threaded elements can be inserted from the inner side into the through-opening and screwed into the counter element, in particular as far as a predefined stop.

Preferably, if the threaded element is a threaded bolt, in each case a nut and preferably a washer, can be mounted and bolted to the threaded bolt.

The bolted connection can preferably take place by means of a rotation angle method. As a result, in particular comparable conditions as in the case of known head-bolt bolted connections, can be produced.

For further advantages, variant embodiments and embodiment details of the further aspects and the possible developments thereof, reference is also made to the previous description regarding the corresponding features and developments of the coupling device.

BRIEF DESCRIPTION OF THE SEVERAL VIEWS OF THE DRAWINGS

Preferred exemplary embodiments will be described by way of example with reference to the attached figures, in which:

FIG. 10A shows a top view of the exemplary embodiment of the covering according to FIG. 9;

FIG. 10B shows a side view of the covering according to FIG. 10A;

In the figures, identical or substantially functionally identical elements are provided with the same reference signs.

General descriptions relate in general to all the embodiments, unless differences are explicitly indicated.

DETAILED DESCRIPTION

The explanation of the disclosure on the basis of examples with reference to the figures is substantially schematic, and, for the sake of better illustration, the elements which are explained in the respective figure may be exaggerated in it and other elements may be simplified. Thus, for example, FIG. 1 schematically illustrates a wind power installation as such, and therefore neither individual tower segments nor a coupling device can be seen.

Figure 1:
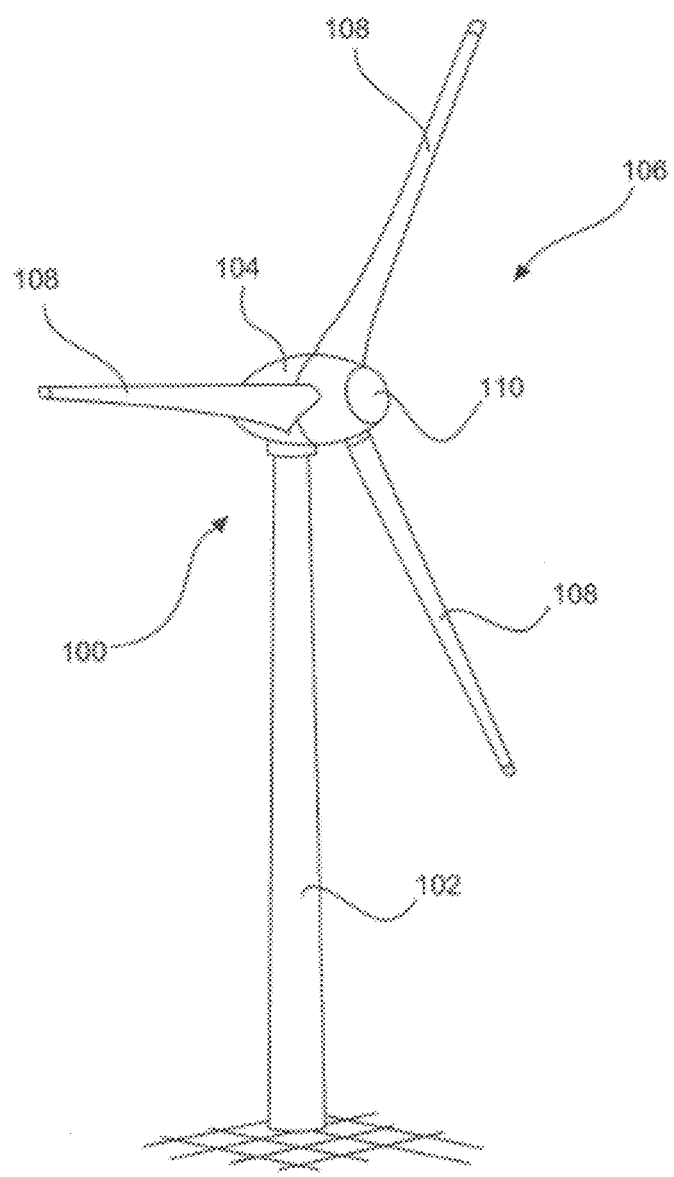
FIG. 1 shows a schematic, three-dimensional view of an exemplary embodiment of a wind power installation.

FIG. 1 shows a schematic, three-dimensional view of a wind power installation 100. The wind power installation 100 has a tower 102 and a nacelle 104 on the tower 102. The tower 102 consists here of tower segments which are arranged on one another and are connected to one another by means of coupling devices (cannot be seen in FIG. 1), as shown, for example, in FIG. 4. An aerodynamic rotor 106 having three rotor blades 108 and a spinner 110 is provided on the nacelle 104. During the operation of the wind power installation 100, the aerodynamic rotor 106 is caused to rotate by the wind and thus also rotates an electrodynamic rotor of a generator that is coupled directly or indirectly to the aerodynamic rotor 106. The electric generator is arranged in the nacelle 104 and generates electrical energy.

Figure 2:
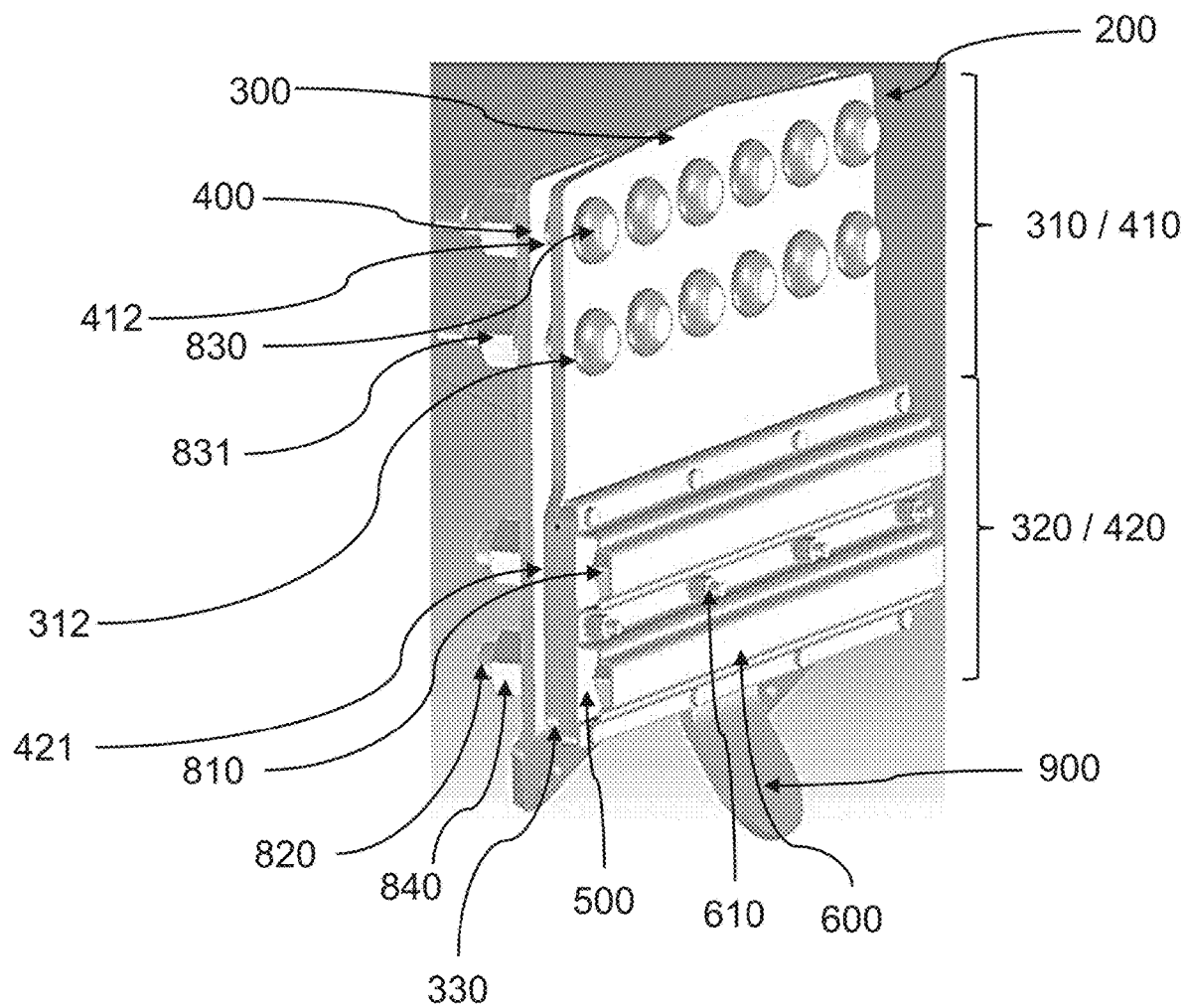
FIG. 2 shows a perspective view of an exemplary embodiment of a coupling device.

FIG. 2 shows an exemplary embodiment of a coupling device 200 with a coupling plate 300 and a corresponding counterplate 400. In the exemplary embodiment shown in FIG. 3, the coupling device 200 is arranged on a first tower segment 210.

Figure 3:
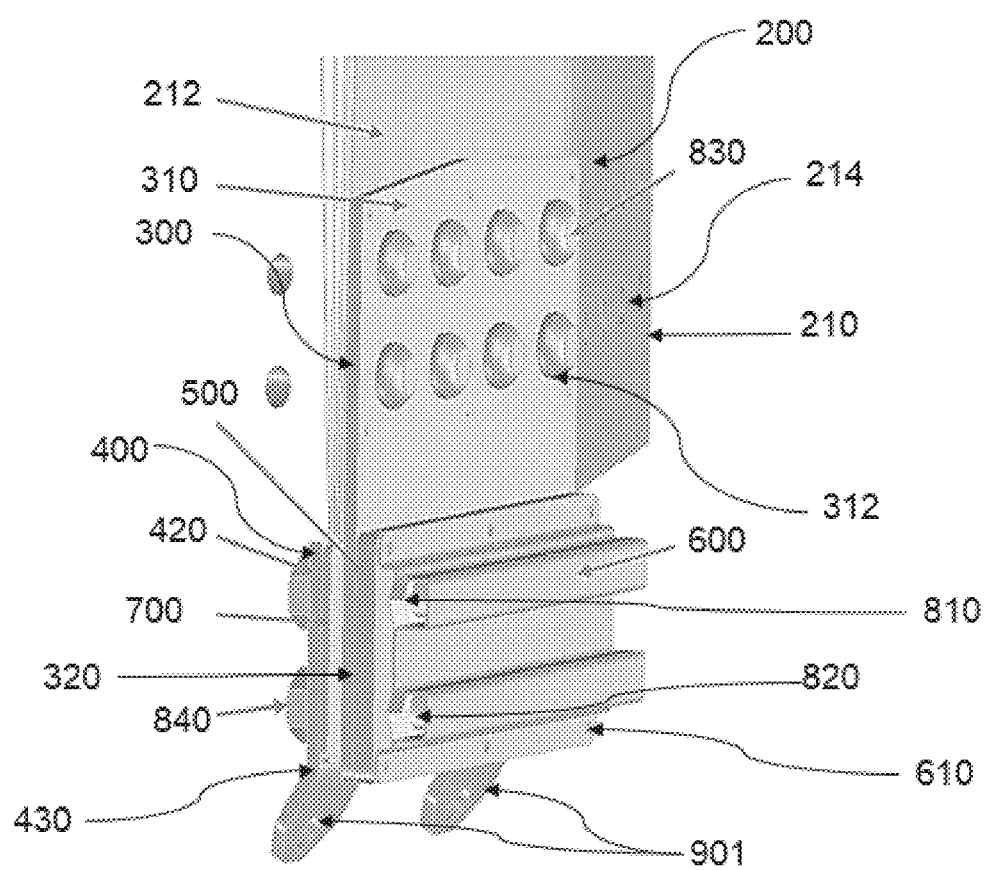
FIG. 3 shows a perspective view of an exemplary embodiment of a tower segment with a coupling device.

While the examples shown in FIGS. 2 and 3 each show a coupling device 200 with a coupling plate 300 and a corresponding counterplate 400, a configuration of a coupling device 200 with only a coupling plate 300, i.e., without a corresponding counterplate 400, is alternatively also possible.

The coupling plate 300 has a fastening portion 310 and a connecting portion 320. The connecting portion 320 is adjacent here to the fastening portion 310. In a manner corresponding to the coupling plate 300, the corresponding counterplate has a corresponding fastening portion 410 and a corresponding connecting portion 420 adjacent thereto.

As FIG. 3 shows by way of example, the fastening portion 310 is designed to be arranged on the first circumferential surface 212 of the first tower segment 210. For this purpose, the fastening portion 310 has a first contact surface (not shown in FIGS. 2 and 3) which, in the fitted state or in the installation state, can be arranged on the first circumferential surface 212 of the first tower segment 210. The corresponding fastening portion 410 correspondingly has a corresponding first contact surface 411 which, as shown in FIG. 2, faces the first contact surface of the fastening portion 310 of the coupling plate 300. The corresponding first contact surface 411 is correspondingly designed in order, in the fitted state or in the installation state, to be arranged on the second circumferential surface (not shown in FIGS. 2 and 3) of the first tower segment 210.

FIG. 3 shows this installation state with the fastening portion 310 of the coupling plate 300 arranged on the first circumferential surface 212 of the first tower segment 210 and with the corresponding fastening portion 410 of the corresponding counterplate 400 (not shown in FIG. 3) arranged on the second circumferential surface of the first tower segment 210.

The first tower segment 210 has through-openings 214 arranged in a row. The fastening portion 310 and the corresponding fastening portion 410 have through-openings 312, 412 which are correspondingly arranged in a row and are coaxial with respect to the through-openings 214 of the first tower segment. Bolts 830 are inserted into the through-openings 312 of the fastening portion 310 from an outer side, i.e., from the side of the coupling device 200 facing the fastening portion 310, are passed through the through-openings 312 of the fastening portion 310, the through-openings 214 of the first tower segment 210 and the through-openings 412 of the corresponding fastening portion 410 and are bolted to in each case one nut 831 from an inner side, i.e., from the side of the coupling device 200 facing the corresponding fastening portion 410.

In the example shown in FIG. 3, in each case four through-openings 312 are arranged in two parallel rows. FIG. 2 shows by way of example in each case six through-openings 312 in two parallel rows.

FIG. 2 shows the coupling device 200 without the first tower segment 210. Accordingly, the through-openings 312 of the fastening portion 310 and the through-openings 412 of the corresponding fastening portion 410 are coaxial with respect to one another. The bolts 830 are correspondingly inserted from the outer side, passed through the through-openings 312,412 and in each case bolted to one nut 831 from the inner side.

The connecting portion 320 and the corresponding connecting portion 420 have mutually aligned second contact surfaces 421 (the second contact surface of the connecting portion of the coupling plate is not shown in the figures). The second contact surface of the coupling plate 300 and the second corresponding contact surface 421 of the corresponding counterplate 400 are designed to be arranged on opposite circumferential surfaces of a second tower segment (not illustrated in FIGS. 2 and 3). It is in each case shown in FIGS. 2 and 3 that threaded bolts 820 are inserted through through-openings (not shown in FIGS. 2 and 3) of the corresponding connecting portion 420 of the corresponding counterplate 400 and are passed through the through-openings of the corresponding connecting portion 420 of the corresponding counterplate 400 and through the through-openings 322 of the connecting portion 320 of the coupling plate 300 and bolted to one nut 810 in each case from the outer side.

In the exemplary embodiments shown here, the threaded bolts 820 are bolted by one nut 840 in each case on the inner side. The corresponding counterplate 400 serves here as a supporting surface for the nuts 840. The threaded bolts 820 can preferably be first of all screwed from the inner side into the nut 810 as far as a predefined stop and subsequently bolted to the nut 840 by means of a rotation angle method.

In addition, a receiving plate 500 with receiving elements for receiving purposes and in the form of a captive-securing means and/or anti-twist protection of the nuts 810, as will also be described in more detail below, is arranged on an outer surface of the coupling plate opposite the second contact surface.

The coupling devices 200 illustrated in FIGS. 2 and 3 also show a covering 600, as will also be described in more detail below, which is in each case arranged on a side of the receiving plate 500 facing away from the coupling plate 300 and is connected via a bolted connection 610 to the receiving plate 500 arranged on the connecting portion 320 of the coupling plate 300.

In FIG. 3, a lining element 700 is arranged on the second contact surface of the connecting portion 320 of the coupling plate 300, which lining element, in the fitted state, can be arranged between the circumferential surface of the second tower segment and the second contact surface 321 of the connecting portion 320 of the coupling plate 300.

The exemplary embodiment shown in FIG. 2 has a guide lug 900 which extends at an angle from the outer edge 330 of the coupling plate 300 and protrudes obliquely from the outer edge.

FIG. 3 shows two guide lugs 901 which protrude obliquely from the outer edge 430 of the corresponding counterplate 400. The guide lugs 900 extend here from the outer edge 430 at an angle to the corresponding connecting portion 420.

The above-described coupling device 200 enables itself to be preassembled on the first tower segment 210 by the fastening portion 310 of the coupling plate 300 and the corresponding fastening portion 410 of the corresponding counterplate 400 being fastened to the first tower segment 210. After arranging the first tower segment 210 and a second tower segment on one another, the installation, in particular the bolting of the connecting portion 320 and of the corresponding connecting portion 420 to the second tower segment 220, can take place from only one side, in particular from the inner side. As a result, installation can be considerably simplified and accordingly an outlay on installation reduced.

Figure 4:
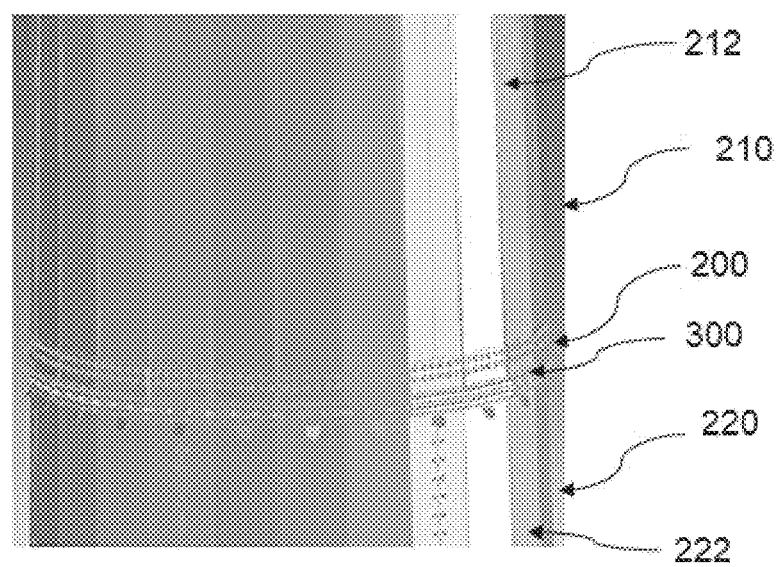
FIG. 4 shows a three-dimensional view of a detail of an exemplary embodiment of part of a tower of a wind power installation.

FIG. 4 shows a three-dimensional view of part of a tower with two coaxial tower segments 210, 220 arranged vertically one above another. The tower segments 210, 220 arranged on one another are connected to one another by means of a plurality of coupling devices 200. The coupling devices 200 each comprise a coupling plate 300 which is arranged on the circumferential surface 212 and on the circumferential surface 222 of the tower segments 210, 220 in a manner overlapping the joint.

Figure 5:
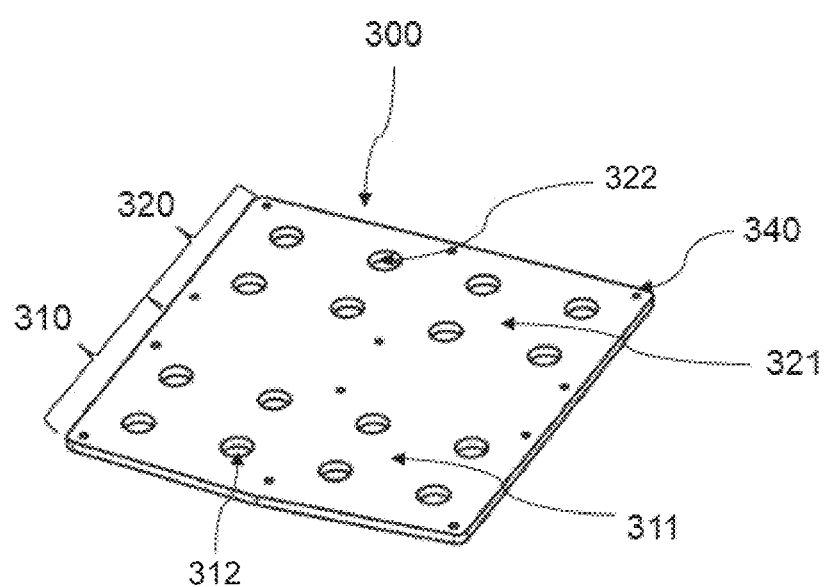
FIG. 5 shows a perspective view of an exemplary embodiment of a coupling plate.
Figure 6:
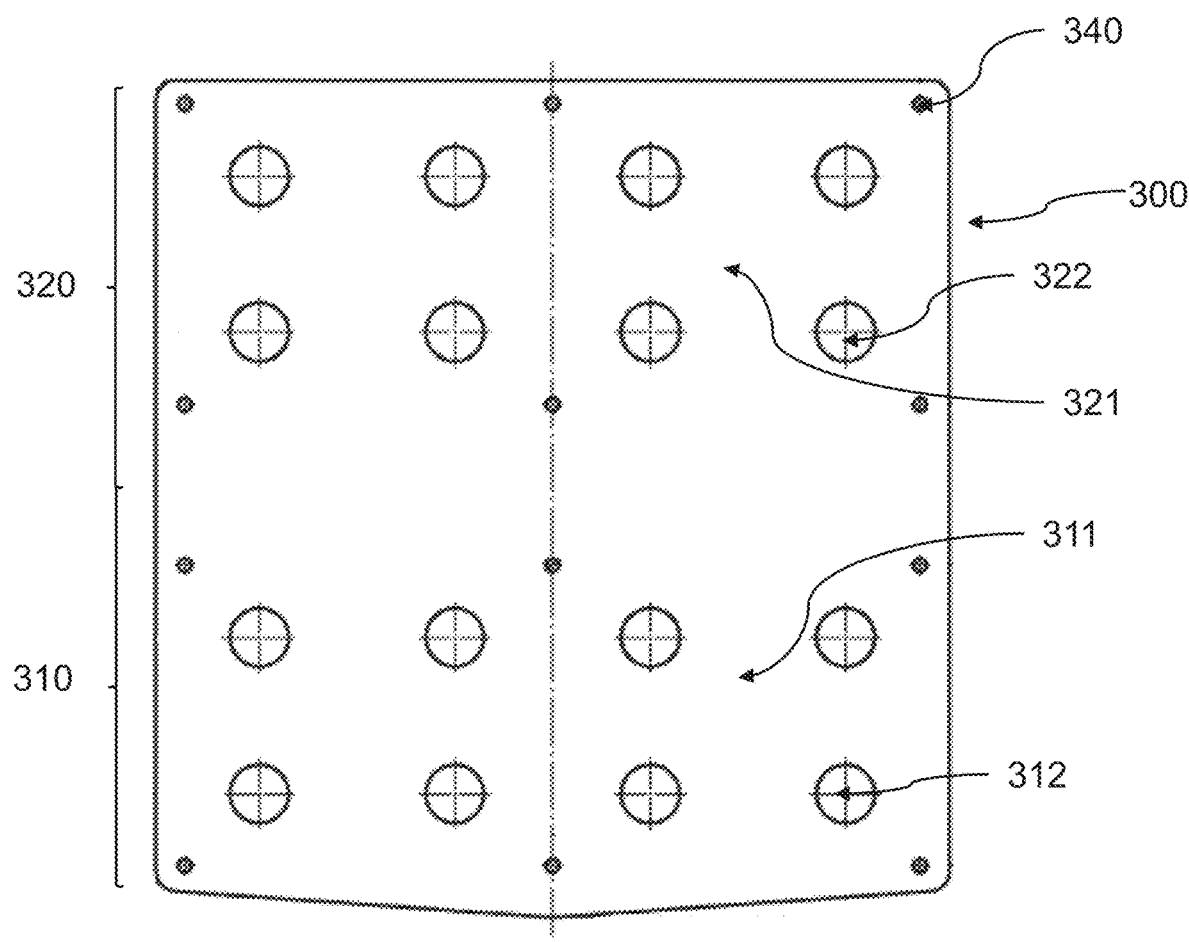
FIG. 6 shows a top view of the exemplary embodiment of the coupling plate according to FIG. 5.

FIGS. 5 and 6 each show an exemplary embodiment of a coupling plate 300. The exemplary coupling plate 300 shown here has a planar extent and comprises the fastening portion 310 with the first contact surface 311 and the adjacent connecting portion 320 with the second contact surface 321. Through-openings 312, 322 are arranged in in each case two parallel rows both in the fastening portion 310 and in the connecting portion 320.

In addition, further through-openings 340 are provided. The further through-openings 340 can be designed, for example, to fasten a receiving plate and/or a covering to the coupling plate 300, in particular by means of a bolted connection or an alternative fastening means, and/or to fasten the coupling plate 300 to the first tower segment and/or to the second tower segment, in particular by means of a bolted connection or an alternative fastening means.

The corresponding counterplate can be designed in a substantially structurally identical manner to the coupling plate 300 shown in FIGS. 5 and 6.

Figure 7:
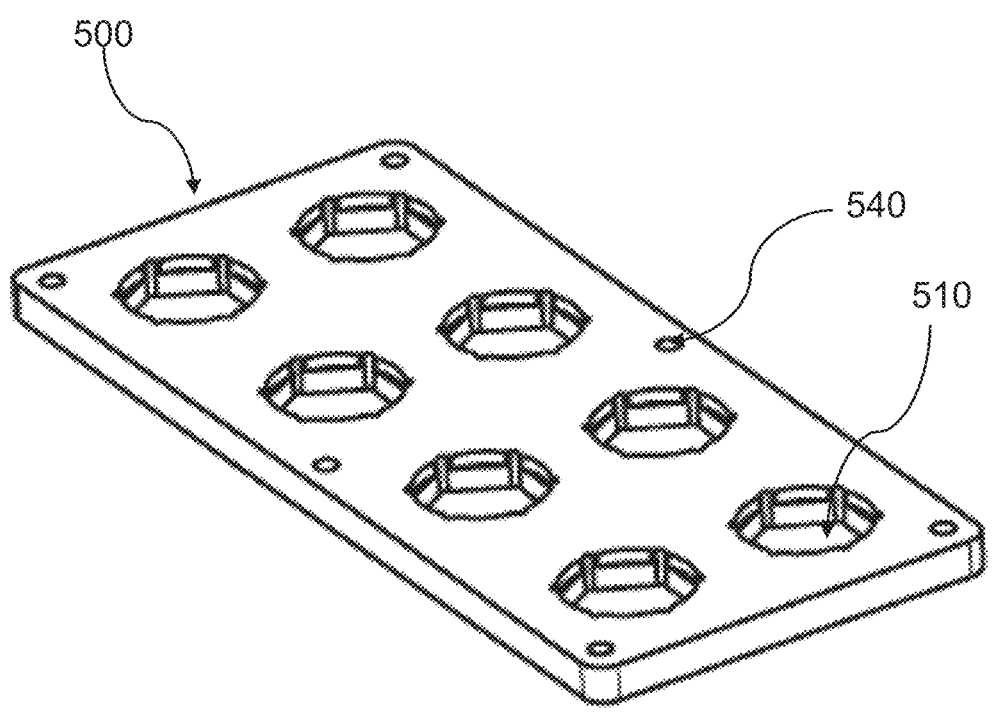
FIG. 7 shows a perspective view of an exemplary embodiment of a receiving plate.
Figure 8:
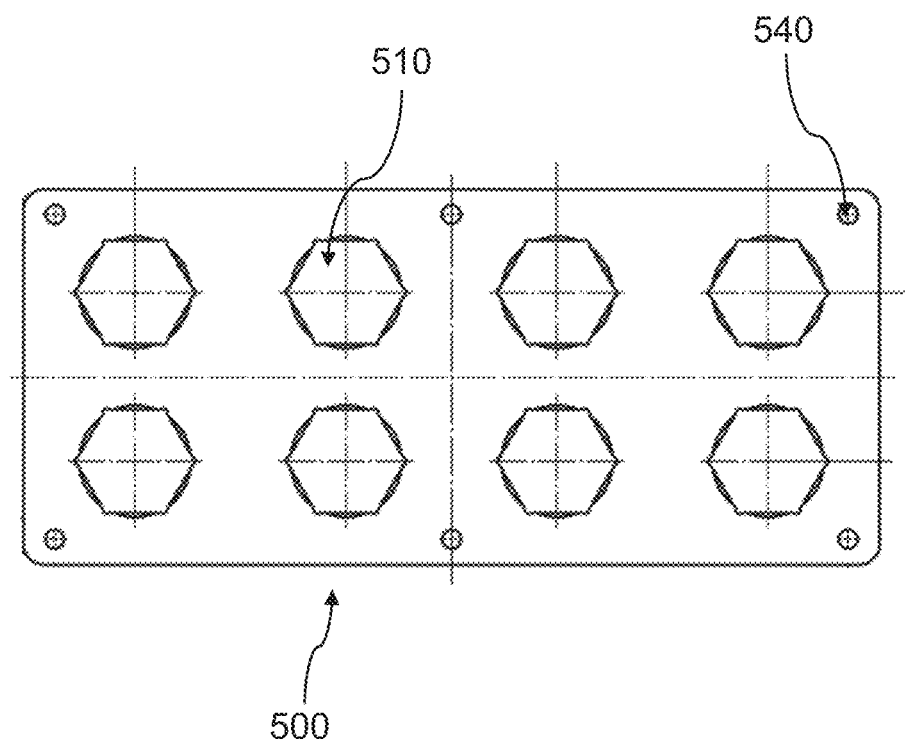
FIG. 8 shows a top view of the exemplary embodiment of the receiving plate according to FIG. 7.

FIGS. 7 and 8 show an exemplary variant embodiment of the receiving plate 500. The receiving plate 500 has receiving elements 510 arranged in two parallel rows in the form of recesses in the receiving plate 500. In the embodiment shown here, the receiving elements 510 have a hexagonal cross section. The shape of the cross section enables a counter element received in the receiving element 510, in particular a hexagonal nut, to be secured against twisting, and therefore the counter element can be blocked from rotating and preventing bolting to the threaded element. In addition, the receiving plate 500 has through-openings 540 which are arranged in an edge region of the receiving plate 500. The through-openings 540 can be designed, for example, to fasten the receiving plate 500 to the connecting portion of the coupling plate and/or to fasten the covering to the receiving plate 500, in particular by means of a bolted connection.

Figure 9:
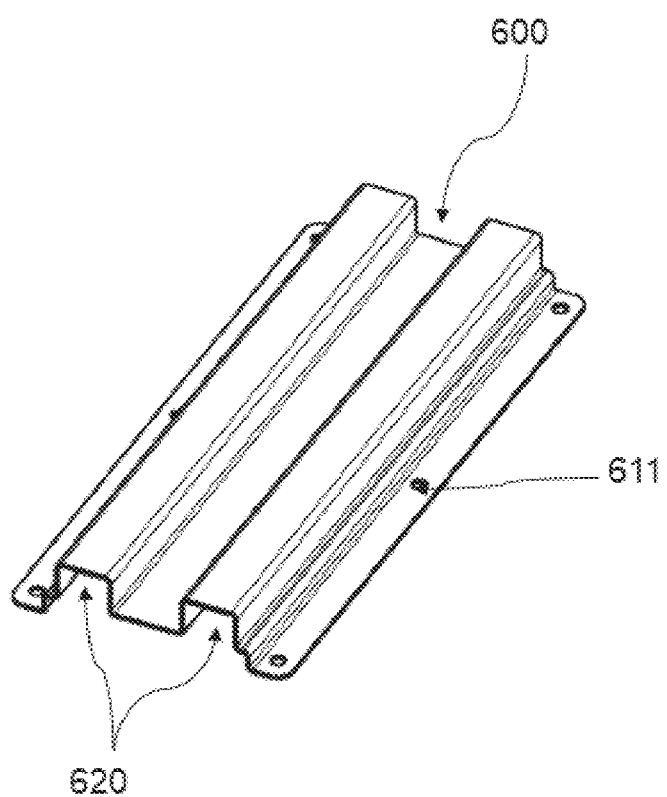
FIG. 9 shows a perspective view of an exemplary embodiment of a covering.

FIGS. 9, 10A and 10B show an exemplary embodiment of a covering 600. The covering 600 can preferably be configured as an angled metal plate. In order to fasten the covering 600 to the receiving plate and/or to the coupling plate, the covering 600 comprises through-openings 611. As a result, for example, the covering 600 can be fastened to the receiving plate and/or to the connecting portion of the coupling plate by means of a fastening means, in particular a bolted connection.

The exemplary embodiment shown here of the covering 600 substantially comprises two parallel rails 620 which are designed to surround the counter elements and in particular to secure them against dropping out. Such a covering 600 is designed in particular to cover a receiving plate with receiving elements which are arranged in two rows. If a receiving plate has three or more rows with receiving elements, a covering can preferably be used with a corresponding number of rails, in particular three or more. Alternatively, the covering 600 can have, for example, a single rail 620 which is designed to surround all the receiving elements of a receiving plate.

Figure 11:
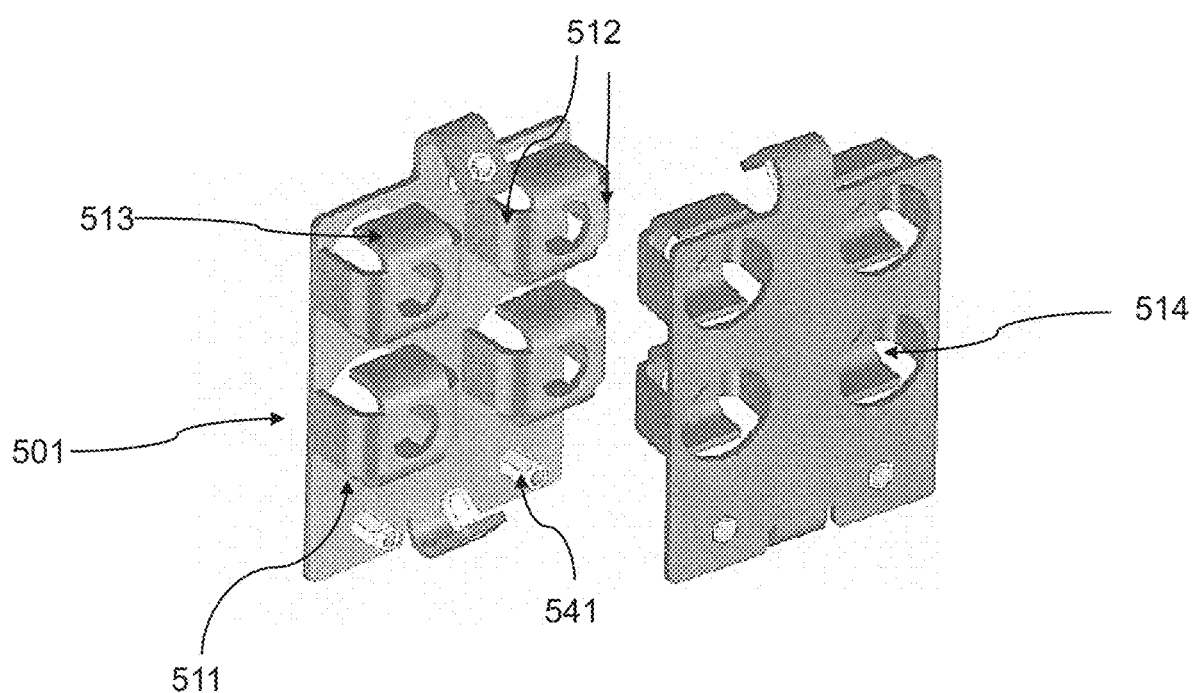
FIG. 11 shows a perspective front view and a perspective rear view of an exemplary embodiment of a receiving plate.

FIG. 11 shows an alternative configuration of a receiving plate 501 with a holder 511 which comprises interconnected webs 512 and clamping limbs 513 connected to the webs 512, in two different views. The webs 512 and the clamping limbs 513 here delimit a cavity 514 of the holder 511. The clamping limbs 513 can be moved from an inoperative position into a clamping position. A cross section which is delimited in the inoperative position is smaller than a cross section delimited in the clamping position. A respective counter element can thereby be clamped in each holder. The clamping force generated by the movement of the clamping limb 513 from the inoperative position into the clamping position can preferably suffice to hold the counter element in a manner secure against twisting. In addition, the receiving plate 501 has fastening means 541 which are designed to fasten the receiving plate 501 to the connecting portion of the coupling plate and/or to fasten the covering on the receiving plate 501.

Figure 12:
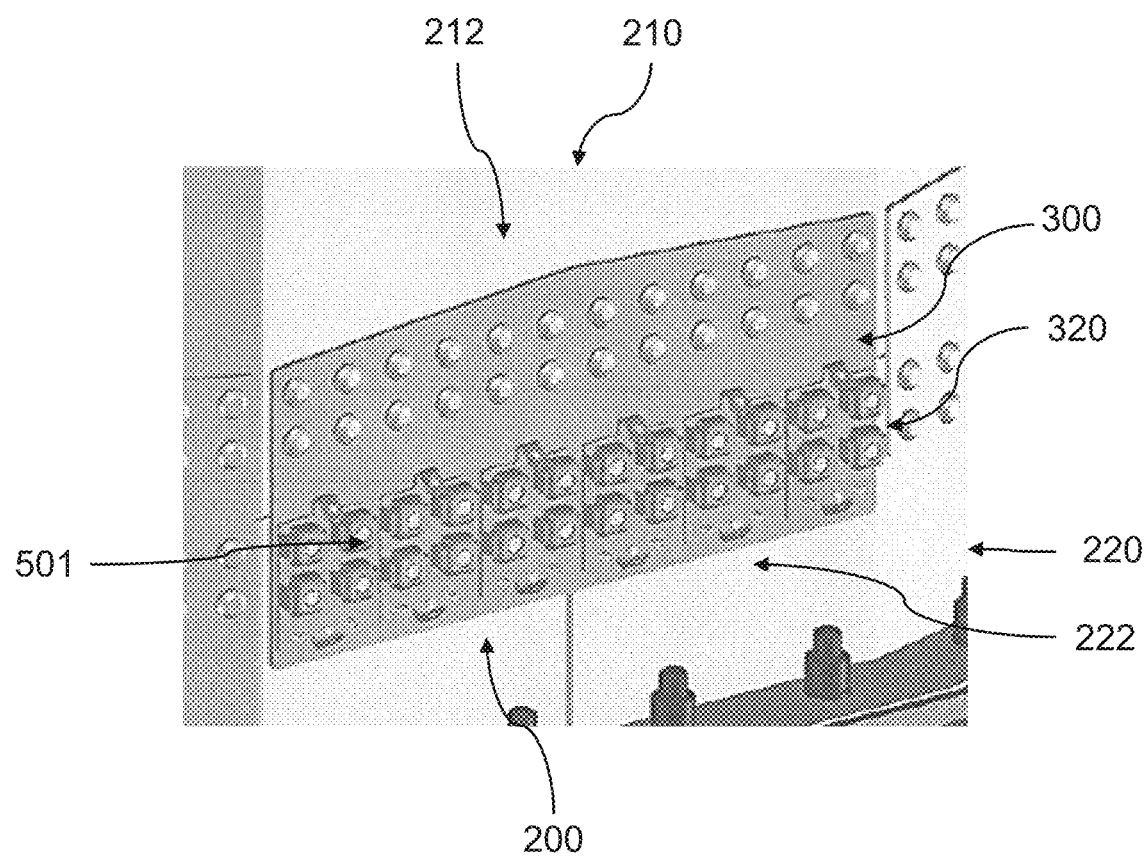
FIG. 12 shows a three-dimensional view of a cutout of an exemplary embodiment of part of a tower of a wind power installation.

FIG. 12 shows a three-dimensional view of a tower with two coaxial tower segments 210, 220 arranged vertically one above another. The tower segments 210, 220 arranged on one another are connected to one another by a coupling device 200. The coupling device 200 comprises a coupling plate 300 which is arranged on the circumferential surfaces 212, 222 of the tower segments 210, 220, in a manner overlapping the joint. According to this exemplary embodiment, a receiving plate 501, as shown in FIG. 11 and described above with respect thereto, is arranged on the connecting portion 320 of the coupling plate 300.

Figure 13:
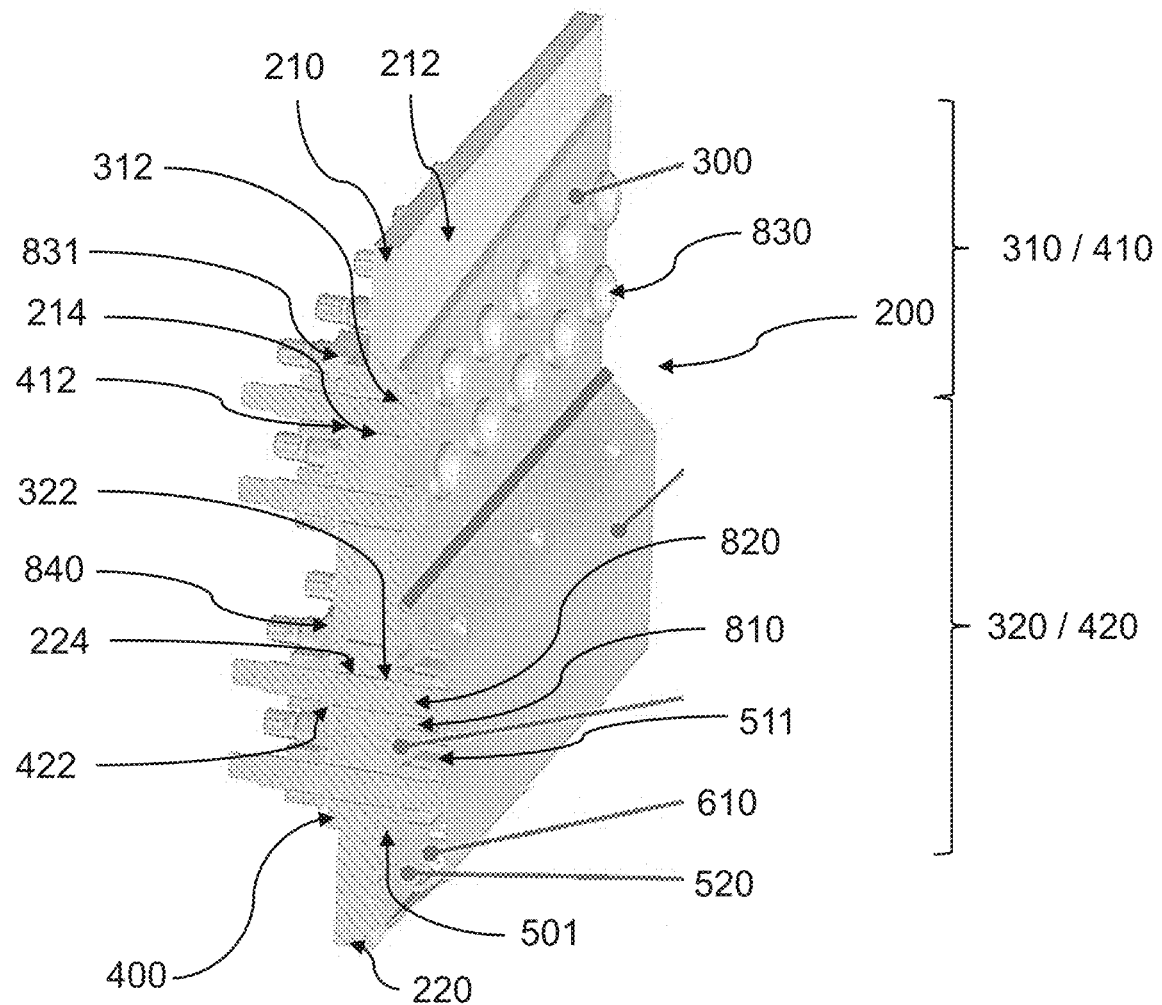
FIG. 13 shows a perspective view with a sectional view of an exemplary embodiment of a coupling device.

FIG. 13 shows a coupling device 200 which couples a first tower segment 210 and a second tower segment 220. The coupling device 200 comprises a coupling plate 300 with a fastening portion 310 and a connecting portion 320 adjacent to the fastening portion 310. The contact surface (not shown in FIG. 13) of the fastening portion 310 is arranged on the first circumferential surface 212 of the tower segment 210. The fastening portion 310 has through-openings 312 which are arranged in two parallel rows and are coaxial with respect to the through-openings 312 of the first tower segment 210.

The embodiment of the coupling device 200 that is shown in FIG. 13 also has a corresponding counterplate 400 which, in a manner corresponding to the coupling plate 300, has a corresponding fastening portion 410 and an adjacent, corresponding connecting portion 420. The corresponding fastening portion 410 likewise has through-openings 412 which are coaxial with respect to the through-openings 214 of the first tower segment 210 and to the through-openings 312 of the fastening portion 310.

In the fitted state shown in FIG. 13, bolts 830 are inserted from an outer side, i.e., the side of the coupling device 200 facing the fastening portion 310, into the through-openings 312 of the fastening portion 310 and passed through the through-openings 312 of the fastening portion 310, the through-openings 214 of the first tower segment 210 and the through-openings 412 of the corresponding fastening portion 410. The bolts are in each case bolted to a nut 831 from an inner side, i.e., the side of the coupling device 200 facing the corresponding fastening portion 410.

The connecting portion 320 and the corresponding connecting portion 420 have second contact surfaces (not shown in FIG. 13) which are in each case mutually aligned. Said second contact surfaces are arranged on respectively opposite circumferential surfaces of the second tower segment 220. The connecting portion 320 and the corresponding connecting portion 420 each have through-openings 322, 422 which are coaxial with respect to through-openings 224 of the second tower segment 220. Threaded bolts 820 are in each case passed through the through-openings 322, 224, 422 and bolted on the outer side to one nut 810 in each case which is arranged in the holder 511 of the receiving plate 501. The receiving plate 501 is fastened to the connecting portion 320 of the coupling plate 300 by means of a bolted connection 520. In the example shown here, the receiving plate 501 is designed in a manner substantially corresponding to the receiving plate which is shown in FIG. 11 and is described with respect thereto.

The threaded bolts 820 are additionally bolted to one nut 840 in each case on a side facing the inner side, i.e., facing the corresponding counterplate 400. The corresponding counterplate 400 serves here as a supporting surface for the nut 840.

In addition, the coupling device 200 comprises a covering 600 which is arranged on the outer side of the receiving plate 500 facing away from the coupling plate 300. The covering 600 is fastened to the receiving plate 500 by means of bolted connections 610.

The coupling device 200 shown in FIG. 13 enables itself to be preassembled on the first tower segment 210 by the fastening portion 310 of the coupling plate 300 and the corresponding fastening portion 410 of the corresponding counterplate 400 being fastened to the first tower segment 210. After arranging the first tower segment 210 and the second tower segment on one another, the installation, in particular the bolting of the connecting portion 320 and of the corresponding connection portion 420 to the second tower segment 220, can take place from only one side, in particular from the inner side. As a result, installation can be significantly simplified and accordingly an outlay on installation reduced.

Figure 14:
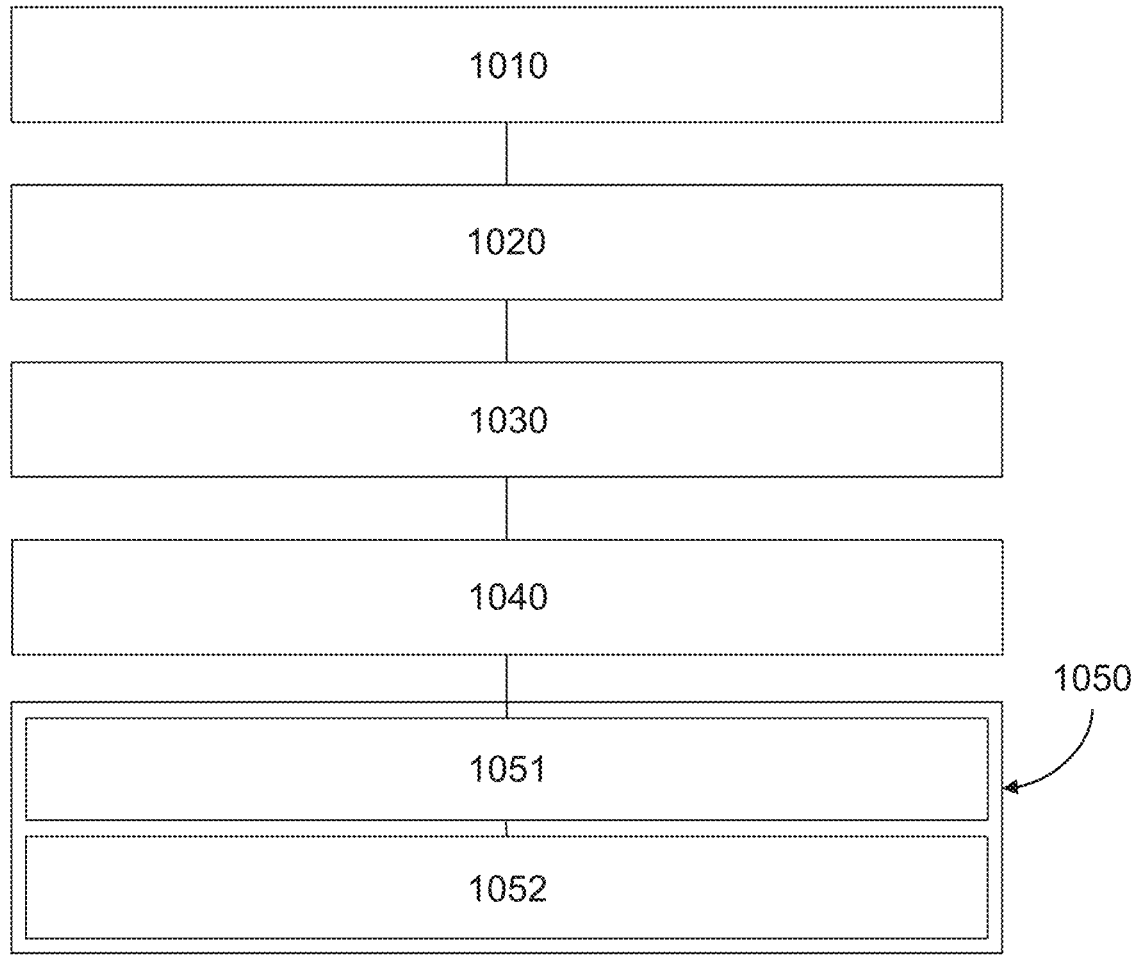
FIG. 14 shows an exemplary method for installing tower segments arranged on one another.

FIG. 14 shows a method for installing tower segments arranged on one another. It is provided here that first of all a first tower segment and a second tower segment are provided 1010. In a next step, two, three or more coupling devices are provided for coupling the tower segments. The two, three or more coupling devices can then be preassembled on the first tower segment 1030. The preassembly of the coupling devices comprises arranging the first contact surface of the fastening portion of the coupling plate on a circumferential surface of the first tower segment at the abutting region. The first tower segment and the second tower segment can subsequently be arranged on one another 1040. The coupling of the first tower segment and of the second tower segment 1050 by connecting the connecting portion of the coupling plate to the second tower segment takes place by inserting threaded elements into one through-opening each of the second tower segment from a side facing a second circumferential surface of the second tower segment and passing the threaded elements through the through-openings of the second tower segment and of the coupling plate 1051, and prestressing a connection of the threaded elements to counter elements 1052, which are received in the receiving elements, by applying a prestressing force to the connection from the side facing the second circumferential surface of the second tower segment.

The coupling device and tower segments connected thereto and also a tower with such tower segments have various advantages. In particular, installation of the tower segments can be simplified and, as a result, the outlay on installation significantly reduced. Furthermore, work safety can be increased since the necessity, during construction of a tower, of arranging a lift cage at an upper end of the tower segments, in order to be able to move down to the height of the joint, is rendered superfluous. As a result, a segmented tower with such coupling devices can be produced overall significantly more cost-effectively and/or more simply and/or more rapidly than with known connecting devices. Consequently, the outlay on personal and/or the outlay on time can be reduced and/or costs can be saved.

LIST OF DESIGNATIONS

100 Wind power installation
102 Tower
104 Nacelle
106 Rotor
108 Rotor blade
110 Spinner
200 Coupling device
210 (First) tower segment
212 (First) circumferential surface/outer circumferential surface
214 Through-opening
220 (Second) tower segment
222 (First) circumferential surface/outer circumferential surface
224 Through-opening
300 Coupling plate
310 Fastening portion
311 First contact surface
312 Through-opening
320 Connecting portion
321 Second contact surface
322 Through-opening
330 Outer edge
340 Through-opening
400 Corresponding counterplate
410 Corresponding fastening portion
411 Corresponding first contact surface
412 Through-opening
420 Corresponding connecting portion
421 Corresponding second contact surface
422 Through-opening
430 Outer edge
500, 501 Receiving plate
510 Receiving element 511 Holder
512 Web
513 Clamping limb
514 Cavity
520 Bolted connection
540 Through-opening
541 Fastening means
600 Covering
610 Bolted connection
611 Through-opening
620 Rails
700 Lining element
810 Counter element/nut
820 Threaded element/threaded bolt
830 Bolt
831 Nut
840 Nut
900, 901 Guide lug
1010 Providing a first tower segment and a second tower segment
1020 Providing two, three or more coupling devices
1030 Preassembling the two, three or more coupling devices on the first tower segment
1040 Arranging the first tower segment and the second tower segment on one another
1050 Coupling the first tower segment and the second tower segment
1051 Inserting the threaded elements into the through-opening of the corresponding counterplate and passing the threaded elements through the through-openings of the corresponding counterplate, the second tower segment and the coupling plate
1052 Prestressing a connection of the threaded elements to the counter elements received in the receiving elements The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A coupling device for coupling first and second tower segments arranged relative to one another of a tubular tower of a wind power installation, the coupling device comprising:
a coupling plate configured to be in contact with abutting regions of the first and second tower segments and arranged with respect to one another, the coupling plate comprising:
a fastening portion having a first contact surface configured to be arranged on a circumferential surface of the first tower segment, and
a connecting portion adjacent to the fastening portion and having a second contact surface configured to be arranged on a circumferential surface of the second tower segment and at least one through-opening for the passage of a threaded element, and
a receiving plate arranged on the connecting portion on an outer surface opposite the second contact surface, the receiving plate comprising at least one receiving element for receiving a counter element configured to be bolted to the threaded element,
wherein the at least one receiving element is formed coaxially with respect to the through-opening and as an anti-twist protection for blocking the counter element from rotating and preventing bolting to the threaded element,
wherein the receiving plate has at least one through-opening for the passage of the threaded element and/or of the counter element, wherein the at least one receiving element comprises a holder which, on a side of the receiving plate facing away from the coupling plate, is arranged in a region of the at least one through-opening and at least partially delimits a cavity for holding the counter element,
wherein the holder comprises interconnected webs fastened to the receiving plate that delimit the cavity, and
wherein the holder comprises at least one clamping limb connected to the webs and is movable from an inoperative position, in which the at least one clamping limb delimits a first cross section of the holder, into a clamping position for clamping the counter element, in which clamping position the at least one clamping limb delimits a second cross section of the holder that is larger than the first cross section.

2. The coupling device according to claim 1, comprising a counterplate,
wherein the coupling plate is configured to contact against a first circumferential surface of the first and second tower segments, wherein the first and second tower segments are arranged stacked on one another at the abutting region, wherein:
the first contact surface of the fastening portion of the coupling plate is configured to be arranged on a first circumferential surface of the first tower segment, and
the second contact surface of the connecting portion of the coupling plate is configured to be arranged on a first circumferential surface of the second tower segment, and
wherein the counterplate is configured for contact against a second circumferential surface of the first and second tower segments at the abutting region, the counterplate comprising:
a fastening portion having a first contact surface configured to be arranged on an inner circumferential surface of the first tower segment, and
a connecting portion adjacent to the fastening portion, the connecting portion of the counterplate having a second contact surface configured to be arranged on an inner circumferential surface of the second tower segment and having at least one through-opening for the passage of the threaded element.

3. The coupling device according to claim 1, wherein the at least one receiving element has a cross section configured to secure the counter element against twisting.

4. The coupling device according to claim 3, wherein the receiving element is:
a recess in the receiving plate, or
a depression in the receiving plate.

5. The coupling device according to claim 4, wherein a cross section of the recess or the depression differs from a circular shape.

6. The coupling device according to claim 1, wherein the at least one receiving element includes a captive-securing means for holding the counter element on the receiving plate.

7. The coupling device according to claim 1, wherein the at least one clamping limb in the clamping position has a clamping force which is designed to hold the counter element captively.

8. The coupling device according to claim 1, comprising a covering arranged on a side of the receiving plate that faces away from the coupling plate and/or on the outer surface of the connecting portion of the coupling plate, wherein the covering surrounds the at least one receiving element and/or the receiving plate.

9. The coupling device according to claim 1, comprising the counter element, wherein the counter element is preassembled on the receiving element, wherein the counter element is a nut.

10. The coupling device according to claim 1, comprising a guide lug arranged on:
- an outer edge of the coupling plate, wherein the outer edge of the coupling plate is adjacent to the connecting portion in a main direction of extent of the coupling plate, and protrudes obliquely from the outer edge, or
- an outer edge of the counterplate, wherein the outer edge of the counterplate is adjacent to the connecting portion of the counterplate in a main direction of extent of the counterplate and protrudes obliquely from the outer edge,
- wherein the guide lug extends from the respective outer edges at an angle of between 90° and 180° with respect to the connecting portion of the coupling plate or with respect to the connecting portion of the counterplate, respectively.

11. First and second tower segments for a tubular tower of a wind power installation, comprising the coupling device according to claim 1,
- wherein the first contact surface of the fastening portion of the coupling plate is arranged on the circumferential surface of the first tower segment at the abutting region, and
- wherein the connecting portion of the coupling plate protrudes over a joint-side edge of the first tower segment.

12. A part of a tower of a wind power installation comprising the first and second tower segments according to claim 11, wherein the first and second tower segments are connected to each other by the coupling device,
- wherein the first contact surface of the fastening portion of the coupling plate is arranged on the circumferential surface of the first tower segment at the abutting region, and
- wherein the second contact surface of the connecting portion of the coupling plate is arranged on the circumferential surface of the second tower segment at the abutting region,
- wherein the second tower segment has at least one through-opening that is coaxial with respect to the at least one through-opening of the connecting portion of the coupling plate,
- wherein the connecting portion of the coupling plate is connected to the second tower segment by a threaded element arranged in the through-openings and is bolted to a counter element received in the receiving element.

13. A tower for a wind power installation, comprising the part of the tower according to claim 12.

14. A wind power installation, comprising the tower according to claim 13 and a nacelle on the tower.

15. A method for installing tower segments arranged on one another, of a tubular tower of a wind power installation, the method comprising:

coupling the coupling plate according to claim 1 to the first tower segment by arranging the first contact surface of the fastening portion of the coupling plate on the circumferential surface of the first tower segment at the abutting region, arranging the first tower segment and the second tower segment one on another, and coupling the first tower segment and the second tower segment by connecting the connecting portion of the coupling plate to the second tower segment by:
- inserting threaded elements into a respective through-opening of the second tower segment from a side facing a second circumferential surface of the second tower segment and passing the threaded elements through the through-openings of the second tower segment and of the coupling plate, and
- prestressing a connection of the threaded elements to counter elements received in the receiving elements by applying a prestressing force to the connection from the side facing the second circumferential surface of the second tower segment.

16. A coupling device for coupling first and second tower segments arranged relative to one another of a tubular tower of a wind power installation, the coupling device comprising:

a coupling plate configured to be in contact with abutting regions of the first and second tower segments and arranged with respect to one another, the coupling plate comprising:
- a fastening portion having a first contact surface configured to be arranged on a circumferential surface of the first tower segment, and
- a connecting portion adjacent to the fastening portion and having a second contact surface configured to be arranged on a circumferential surface of the second tower segment and at least one through-opening for the passage of a threaded element, and a receiving plate arranged on the connecting portion on an outer surface opposite the second contact surface, the receiving plate comprising at least one receiving element for receiving a counter element configured to be bolted to the threaded element, wherein the at least one receiving element is formed coaxially with respect to the through-opening and as an anti-twist protection for blocking the counter element from rotating and preventing bolting to the threaded element, a counterplate, wherein the coupling plate is configured to contact against a first circumferential surface of the first and second tower segments, wherein the first and second tower segments are arranged stacked on one another at the abutting region, wherein:
- the first contact surface of the fastening portion of the coupling plate is configured to be arranged on a first circumferential surface of the first tower segment, and
- the second contact surface of the connecting portion of the coupling plate is configured to be arranged on a first circumferential surface of the second tower segment, wherein the counterplate is configured for contact against a second circumferential surface of the first and second tower segments at the abutting region, the counterplate comprising:

a fastening portion having a first contact surface configured to be arranged on an inner circumferential surface of the first tower segment, and a connecting portion adjacent to the fastening portion, the connecting portion of the counterplate having a second contact surface configured to be arranged on an inner circumferential surface of the second tower segment and having at least one through-opening for the passage of the threaded element, a lining element configured to:
be arranged on the first contact surface of the fastening portion and/or the second contact surface of the connecting portion of the coupling plate, or
be arranged on the first contact surface of the fastening portion and/or the second contact surface of the connecting portion of the counterplate,
wherein the lining element comprises at least one through-opening for the passage of the threaded element and is configured to be arranged in such a manner that the at least one through-opening of the lining element and the at least one through-opening of the connecting portion of the coupling plate and/or the at least one through-opening of the connecting portion of the counterplate are coaxial with respect to one another.

17. The coupling device according to claim 12, wherein the at least one receiving element comprises a holder which, on a side of the receiving plate facing away from the coupling plate, is arranged in a region of the at least one through-opening and at least partially delimits a cavity for holding the counter element.

18. The coupling device according to claim 17, wherein the holder comprises interconnected webs fastened to the receiving plate that delimit the cavity.

* * * * *